United States Patent
Leseman et al.

(10) Patent No.: US 9,308,585 B2
(45) Date of Patent: Apr. 12, 2016

(54) AEROSOL REDUCTION/EXPANSION SYNTHESIS (A-RES) FOR ZERO VALENT METAL PARTICLES

(75) Inventors: Zayd Leseman, Albuquerque, NM (US); Claudia Luhrs, Rio Rancho, NM (US); Jonathan Phillips, Rio Rancho, NM (US); Haytham Soliman, Houston, TX (US)

(73) Assignee: STC.UNM, Albuquerque, NM (US)

( * ) Notice: Subject to any disclaimer, the term of this patent is extended or adjusted under 35 U.S.C. 154(b) by 299 days.

(21) Appl. No.: 13/884,746

(22) PCT Filed: Nov. 10, 2011

(86) PCT No.: PCT/US2011/060211
§ 371 (c)(1),
(2), (4) Date: Jul. 12, 2013

(87) PCT Pub. No.: WO2012/064972
PCT Pub. Date: May 18, 2012

(65) Prior Publication Data
US 2013/0276583 A1    Oct. 24, 2013

Related U.S. Application Data

(60) Provisional application No. 61/456,680, filed on Nov. 10, 2010.

(51) Int. Cl.
| | |
|---|---|
| *B22F 9/26* | (2006.01) |
| *B82Y 40/00* | (2011.01) |
| *B22F 1/00* | (2006.01) |

(52) U.S. Cl.
CPC . *B22F 9/26* (2013.01); *B82Y 40/00* (2013.01); *B22F 1/0018* (2013.01); *B22F 1/0096* (2013.01)

(58) Field of Classification Search
None
See application file for complete search history.

(56) References Cited

U.S. PATENT DOCUMENTS

| | | | |
|---|---|---|---|
| 5,439,502 A | 8/1995 | Kodas et al. | |
| 6,679,938 B1 | 1/2004 | Kim et al. | |
| 6,689,192 B1 | 2/2004 | Phillips et al. | |
| 8,709,126 B1 * | 4/2014 | Luhrs et al. | 75/351 |
| 2002/0006470 A1 | 1/2002 | Eberspacher et al. | |
| 2008/0064767 A1* | 3/2008 | Chou et al. | 516/97 |
| 2010/0143721 A1* | 6/2010 | Chen et al. | 428/407 |

FOREIGN PATENT DOCUMENTS

WO    WO-2011/063028 A1 *    5/2011

* cited by examiner

*Primary Examiner* — George Wyszomierski
(74) *Attorney, Agent, or Firm* — MH2 Technology Law Group, LLP

(57) ABSTRACT

Various embodiments provide methods of forming zero valent metal particles using an aerosol-reductive/expansion synthesis (A-RES) process. In one embodiment, an aerosol stream including metal precursor compound(s) and chemical agent(s) that produces reducing gases upon thermal decomposition can be introduced into a heated inert atmosphere of a RES reactor to form zero valent metal particles corresponding to metals used for the metal precursor compound(s).

12 Claims, 1 Drawing Sheet

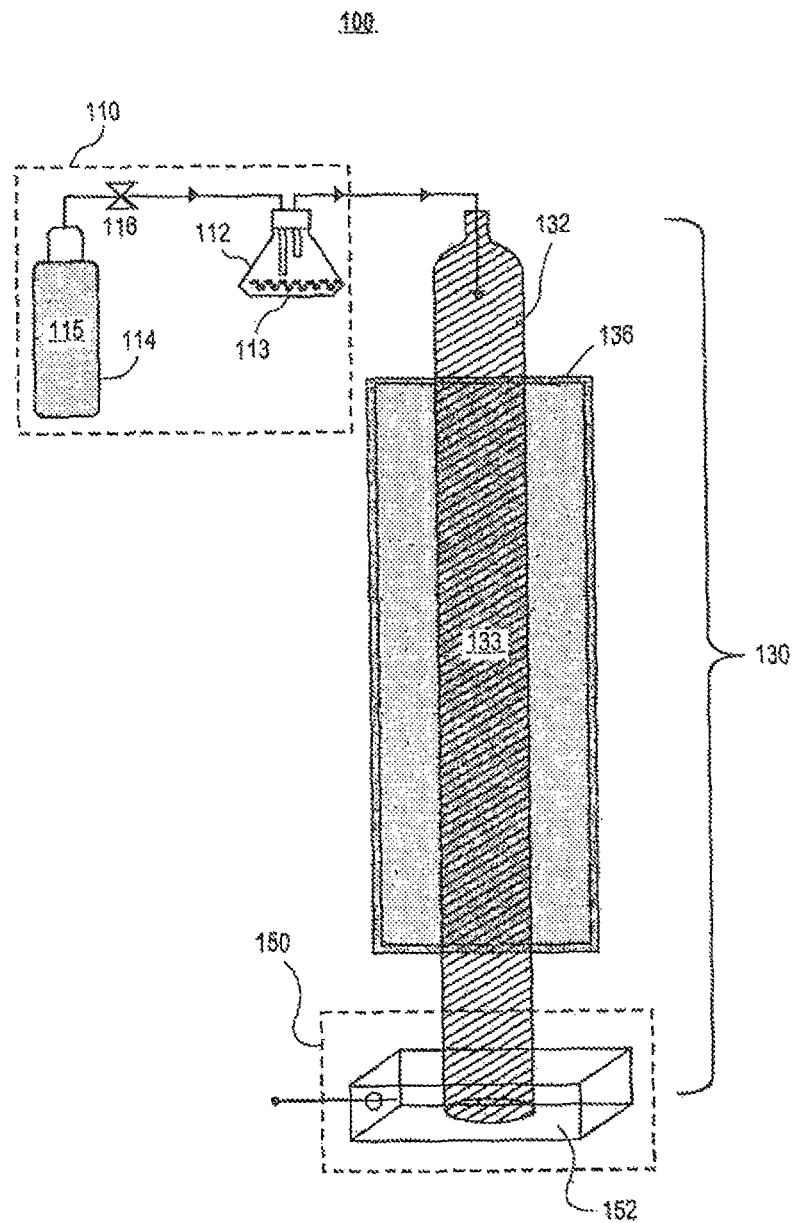

AEROSOL REDUCTION/EXPANSION SYNTHESIS (A-RES) FOR ZERO VALENT METAL PARTICLES

RELATED APPLICATIONS

This application is a U.S. National Stage application of PCT/US2011/060211 filed 10 Nov. 2011, which claims priority to U.S. Provisional Patent Application Ser. No. 61/456,680 filed Nov. 10, 2010, which is hereby incorporated by reference in its entirety.

GOVERNMENT RIGHTS

This invention was made with Government support under Grant No. DE-AC52-06NA25396 DOE/NNSA awarded by Los Alamos National Laboratory. The U.S. Government has certain rights in the invention.

BACKGROUND

Metal particles in the micron scale range are important to large industries including the paint industry, the metal parts manufacturing industry, etc. Parts made with metal particles can be complex in shape. For example the metal powder can be introduced into a die and sintered, or can be made by laser sintering layers built one layer at a time using 3-D printing devices. These parts are useful for appliances, bearings and gears, cutting tools, filters, and electrodes.

Conventional production technologies for making micron scale metal particles include atomization, electrolysis, plasma spray, and solid state reduction, in atomization, molten metal is forced through nozzles to form liquid jets. These jets are rapidly cooled with water or inert gases to create particles. Consequently, purity is compromised by the inclusion of oxygen gettering species in the molten metal. In addition, this process is energy inefficient. For example, only about 1% of the pumping energy actually goes into particle formation. Electrolysis requires a variation on the standard electrolytic processes, such that particles rather than films are produced at an electrolytic cell cathode. Consequently, this process is limited to particular metals, as it requires dissolution of metal, which is often expensive. In solid state reduction, finely ground oxide particles are treated with reducing gases, at a temperature lower than the melting point of the metal to produce reduced and sintered particles. Consequently, the metals created using this multi-step method have relatively high impurity levels. Plasma spray technology does yield high purity particles of controlled shape. However, it is not widely used because the technology is inherently energy intensive, and requires expensive, sophisticated equipment.

Production of metal particles in the nanometer scale have been introduced in the last decade by methods including sono-chemistry, wet chemistry methods, co-precipitation micro-emulsion methods, and laser-driven thermal methods. Other methods for making metal particles include metal gas evaporation, metal evaporation in a flowing gas stream, mechanical attrition, sputtering, electron beam evaporation, electron beam induced atomization of binary metal azides, expansion of metal vapor in a supersonic free jet, and pyrolysis of organometallic compounds. However, all of these methods face obstacles of contamination, expensive processes, low yields, and difficulty of mass production and industrial up scaling.

It is thus desirable to provide a method/process capable of producing zero valent metal/metal alloy particles in the micron, sub-micron, and/or nanometer size range.

SUMMARY

According to various embodiments, the present teachings include a method of forming a metal particle. The metal particle can be formed from an aerosol stream. The aerosol stream can include metal precursor compound(s) and a chemical agent that produces reducing gases upon thermal decomposition. Each metal precursor compound can include positive valent metal(s). The aerosol stream can then flow through a heated inert atmosphere in a reduction expansion synthesis (RES) reactor to form a plurality of zero valent metal particles. The zero valent metal particles can correspond to the positive valent metal(s).

According to various embodiments, the present teachings also include a method of forming a metal particle. The metal particle can be formed from an aerosol stream. The aerosol stream can include a metal precursor compound and a nitrogen-hydrogen (N—H) containing molecule in a carrier gas. The metal precursor compound can include a positive valent metal. The aerosol stream can then flow through a heated inert atmosphere in a vertical reduction expansion synthesis (RES) reactor to form a plurality of zero valent metal particles corresponding to the positive valence metal. The plurality of zero valent metal particles can be collected at a bottom end of the vertical RES reactor.

According to various embodiments, the present teachings further include a method of forming a metal particle. The metal particle can be formed from an aerosol stream. The aerosol stream can include a metal precursor compound and a nitrogen-hydrogen (N—H) containing molecule in a carrier gas. The metal precursor compound can include one or more of a metal hydroxide, a metal oxide, and a combination thereof. The aerosol stream can flow through a heated inert atmosphere in a reduction expansion synthesis (RES) reactor to form a plurality of zero valent metal particles from the metal precursor compound. The plurality of zero valent metal particles can be collected from the RES reactor.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the invention.

FIG. 1 depicts an exemplary apparatus for forming zero valent metal particles including metal alloy particles in accordance with various embodiments of the present teachings.

DESCRIPTION OF THE EMBODIMENTS

Reference will now be made in detail to exemplary embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Various embodiments provide materials and methods for forming zero valent metal particles. As used herein, the term "zero valent metal particles" refers to particles having zero valence and formed of one or more metals. In some cases, the zero valent metal particles can be formed of one metal. In other cases, the zero valent metal particles can be formed of two or more distinct metals, which are also referred to herein as metal alloy particles.

The zero valent metal particles can be formed using an aerosol method in combination with a reduction and/or expansion synthesis (RES). In the aerosol-RES (or A-RES) process, an aerosol stream can be formed to include, for example, one or more metal precursor compounds (e.g., metal hydroxides, metal oxides, etc.) and a chemical agent in a carrier gas. The chemical agent, e.g., a nitrogen-hydrogen (N—H) containing molecule such as urea, can be capable of releasing gaseous reducing species upon reaching its decomposition temperature. The carrier gas can include any suitable aerosol carrier gases, e.g., nitrogen. The aerosol stream can then be fed into a RES reactor including a heated inert atmosphere to form zero valent metal particles, which corresponds to metal(s) used for the metal precursor compound(s). The formation of zero valent metal particles in the RES reactor can include reduction and/or expansion processes. For example, if the metal precursor compounds are oxides (e.g. NiO), they can be reduced by gases released during the decomposition of the chemical agent species. Alternatively, if the metal precursor compounds are, e.g., nitrate species, they can decompose at roughly the same temperature range as for the chemical agent species, e.g., urea.

FIG. 1 depicts an exemplary apparatus 100 of forming zero valent metal particles in accordance with various embodiments of the present teachings. The exemplary apparatus 100 can include an aerosol forming section 110, a RES section 130, and a product collection section 150.

The aerosol forming section 110 can include a container 112 such as a flask. Metal precursor compound(s) and chemical agent(s) can be physically mixed (see the mixture 113), for example, by mechanical grinding, in the container 112.

The metal precursor compound(s) can be any metal compounds containing one or more non-zero (e.g., positive) valent metals. The metal precursor compound(s) can include, but are not limited to, hydroxides, oxides, nitrates, hydrated nitrates, nitrates, oxide-nitrides, halogens such as chlorides, bromides, iodides, or fluorides, and/or other compounds of one or more metals. Among these, exemplary metal precursor compounds can include, but are not limited to, $Ni(OH)_2$, $NiO$, $Fe(NO_3)_3 \cdot 9H_2O$, $Ni(NO_3)_2 \cdot 6H_2O$, $Co(NO_3)_2 \cdot 6H_2O$, $In(NO_3)_3 \cdot H_2O$, $Ga(NO_3)_3 \cdot 6H_2O$, etc., providing the source of metal(s) for forming the zero valent metal particles. The bonds in the acetal precursor compounds can be ionic, covalent, or partially ionic in character.

In embodiments, the one or more metals corresponding to the metal precursor compound(s) can include virtually any metal, such as, for example, transitions metal in columns IB, IIB, VB, VIB, and/or VIIB in the periodic table, alkali metals in column IA, and alkali earth element in column IIA in the periodic table, but not limited to those. In certain embodiments, metallic particles that include Al and Sn can be made from species in columns IIIA and IVA in the periodic table.

Depending on the final particles to be formed, the physical mixture 113 placed in the container 112 can include metal precursor compound(s) having different metals, to form metal alloy, wherein each metal alloy particle can include two or more distinct metals having a metal ratio that substantially matches the metal ratio between the acetal precursor compound(s) in the physical mixture 113.

The chemical agents can include, but are not limited to, nitrogen-hydrogen (N—H) containing molecules such as urea $[(NH_2)_2CO]$, ammonia ($NH_3$), a compound containing —$NH_2$ or —NH, etc. For example, urea can be decomposed to generate species including CO, $H_x$, and $NH_x$ groups, which are active and ready for reduction reactions. The chemical agents can also include those present in nature to generate reducing species upon decomposition.

In embodiments, the physical mixture 113 can include a molar ratio of nitrogen-hydrogen (N—H) containing molecules to positive valent metal atoms ranging from about 1:1 to about 35:1, such as ranging from 5:1 to about 10:1. In one example, a molar ratio of urea to $Ni^{2+}$ atoms for forming zero valent Ni particles can be about 7:1.

The physical mixture 113 can be homogenously mixed in the container 112, e.g., by removing air pockets therefrom. The physical mixture 113 can then be treated by a carrier gas to form an aerosol stream. For example, as shown in FIG. 1, the aerosol stream can be formed in the aerosol forming section 110 by purging a carrier gas 115 from the gas container 114 into the physical mixture 130. In embodiments, the container 112 can be vibrated to facilitate creation of the aerosol stream. In an exemplary embodiment, the carrier gas 115 can include ultra-high purity nitrogen (e.g., of about 99.9999%) at a flow rate of about 900 sccm (i.e., standard cubic centimeters per minute). In embodiments, a rotameter 116 can be optionally used to control the gas flow from the gas container 114.

As disclosed herein, the aerosol stream can be formed to have an aerosol density. For example, the aerosol stream can have a solid concentration ranging from about 0.01% to about 50% by volume or from about 0.1% to about 1% by volume.

The aerosol stream formed at section 110 can be fed into the RES section 130, particularly, into a RES reactor 132 as shown in FIG. 1. The RES reactor 132 can be, e.g., a quartz tube. The RES reactor 132 can be vertically configured. The RES reactor 132 or the exemplary quartz tube can be inserted through a furnace 136, e.g., a vertical furnace, such that a length portion of the RES reactor 132 is located in the furnace. Each end of the RES reactor 132 can be located outside the furnace 136 having the same or different length outside the furnace 136.

Before the aerosol stream flows into the RES reactor 132, the RES reactor 132 can be purged with an inert gas and can be heated by the furnace 136 to provide a heated inert atmosphere 133 in the RES reactor 132. The inert gases can be the same or different than the carrier gas of the aerosol stream. The inert gases can be chemically inert and do not react with any components, e.g., metals, in the reaction chamber. The inert gases can include nitrogen, argon, helium, etc.

The RES reactor 132 can be heated to a temperature in a range between the decomposition temperature of the chemical agent such as urea and the melting temperature of the target zero valent metals. For example, the heated inert atmosphere 133 can be heated to a temperature ranging from about 400° C. to about 1500° C., or from about 1000° C. to about 1500° C., such as more than about 1000° C. to about 1500° C.

In embodiments, the aerosol stream can have a flow rate ranging from about 1 cc/min to about 1000 $m^3$/sec, or from about 100 cc/min to about 1500 cc/min, or from about 100 cc/min to about 1000 cc/min through the heated inert atmosphere 133 in the RES reactor 132 with a residence time for less than about 100 seconds such as about 1 second or less to form zero valent metal particles.

In one embodiment, after the heated inert atmosphere is formed, the inert gas supply can be removed and the inert atmosphere can still be maintained at the heating temperature. However, in embodiments, the inert gas can continue to flow through the RES reactor 132 until zero valent metal particles are formed.

Zero valent metal particles can be formed in the RES reactor 132 from the aerosol stream flowing through the heated inert atmosphere 133. The zero valent metal particles can then be collected at an outlet, e.g., bottom end, of the RES reactor 132. For example, the formed zero valent metal particles can be collected in a product collection chamber 152. Note that the carrier gas from the aerosol stream flowing through the RES reactor can pressurize the product collection chamber 152 such that air or oxygen can be prevented from coming into contact with the resultant product. The collected zero valent metal particles can then be cooled to the ambient temperature.

As disclosed herein, the aerosol reduction/expansion synthesis (A-RES) process can be an advance on a RES process only without using aerosol. That is, the disclosed A-RES process is not an obvious extrapolation of the RES process. For example, while RES is limited to batch processing, A-RES can provide aerosol variations and can be more readily commercialized as industry prefers continuous processes for at least cost reasons. Additionally, the A-RES process can be more efficient than the RES process. For example, the RES batch process may take several or tens of hours to produce a certain amount of metal particles while A-RES may take a fraction of a second. Moreover, the resultant particle products produced with the batch RES and the aerosol RES can be different in particle size, size distribution, crystallinity, porosity, etc. For this reason, one process or the other of RES and A-RES can be preferred for particular applications. The present disclosure can be applicable to existing technologies for which there is a growing market.

The resulting zero valent metal particles can contain one or more metals including, but not limited to, Ni, Fe, Sb, Co, Mg, Mn, Cr, Cu, Zn, and/or W. In embodiments, the metal precursor identity, the ratio of metal atoms from precursor compounds to the chemical agent in the physical mixture, the mixing procedure, the maximum heating temperature, the flow rate of the aerosol stream, identity of the inert/carrier gas, and/or other parameters can be used to control particle sizes and size distribution of the resulting zero valent metal particles. The resultant particles can be porous or non-porous.

In one embodiment, the zero valent metal particles can include nanoparticles having an average particle size of from about 1 nm to about 10,000 nm, or from about 1 nm to about 100 nm, or from about 1 nm to about 30 nm. The nanoparticles can be porous nanoparticles having an average pore size ranging from about 0.1 nm to about 10,000 nm, from about 1 nm to about 100 nm, or from about 1 nm to about 30 nm. These nanoparticles can be non-agglomerated and/or agglomerated.

The zero valent metal particles can include micro- or submicro particles. For example, the zero valent metal particles can include agglomerated particles having an average particle size ranging from about 100 nm to about 10,000 nm, or from about 10 to about 10,000. The agglomerated particles can have an average aspect ratio ranging from about 1 to about 100, or from about 1 to about 3. Particles can be prepared in aggregates of nano and micro particles. In the aerosol stream, agglomerations of primary particles can occur via collision processes, which can initially create 'lightly' sintered aggregates. With sufficient time, such aggregates can be sintered further to form highly porous, multi-micron dimension particles.

In embodiments, the zero valent metal particles can include hollow sphere particles having a diameter ranging from about 10 to about 10,000 nm. In some cases, these 'hollow sphere' can be described as nearly spherical particles with several large pores. The pores in this case can be of the order of about 1% to about 80% of the size of the particles.

EXAMPLES

In this example, solid urea was ground into fine powder, which was then passed through a 400 mesh (i.e., about 400 openings per linear inch of mesh). The urea was then added to a flask of either nickel(II) hydroxide or nickel(II) oxide. Both nickel compounds were purchased from Sigma Aldrich and used without any modifications.

A ratio of about 1:7 exists between the nickel in the nickel (II) hydroxide and the amine functional group in the urea ($-NH_2$). Specifically, this was obtained by adding about 3 g of $Ni(OH)_2$ to about 16.17 g of ground urea powder in the flask. Similarly, to achieve the 1:7 ratio between nickel in the nickel(II) oxide and the amine function group in urea, a sample was prepared by adding about 4 g of NiO to about 26.75 g of ground urea powder in the flask. In order to obtain a mare uniform heterogeneous mixture of the urea and nickel compounds, flasks containing nickel compounds were shaken lightly. A physical mixture was obtained when the color of the mixture was uniform. Flasks were sealed with a two-hole rubber stopper shown in FIG. 1 as an example.

A specific apparatus was used (referring to FIG. 1) having a quartz tube with a length of about 188 cm, an outer diameter (OD) of about 38 mm, and an inner diameter (ID) of about 35 mm. On the top end, the quartz tube had a 5 cm gas port with an ID of about 10.5 mm and an OD of about 12.75 mm. The quartz tube was inserted in a vertical furnace such that a length of about 125 cm was located in the vertical furnace and a length of about 33 cm from each side of the quartz tube was located outside the vertical furnace.

The experiments commenced by purging the flask with about 900 sccm of ultra-high purity nitrogen, while heating the single-zone furnace to a temperature of about 1000° C. Flow of the gas was controlled by a rotameter. When the vertical furnace reached the desired temperature, the nitrogen feed was switched to the flask that contained the mixtures at a rate of about 900 sccm through one of the two holes of its stopper and another feed was connected from the flask to the quartz tube. The flask was gently vibrated to create an aerosol stream.

The aerosol stream including fine powders of urea and nickel compounds then traveled through the hoses into the quartz tube, whereby depositing green, white, and black materials on the side of the quartz tube. Beneath the lower outlet of the quartz tube, a fine, dark and metallic powder was collected using a weighing paper in an empty beaker. The beaker was placed in a plastic box that had an opening on its top of about 38 mm in diameter to allow the quartz tube entry into the box via close tolerances. Nitrogen flowing through the quartz tube pressurized the plastic box such that air was prevented from coming into contact with the product.

The resultant nickel particles were collected in the bottom of the quartz tube reactor with minimal exposure to air. Metallic particles obtained from both the nickel(II) hydroxide and nickel(II) oxide each mixed with urea were loosely agglomerated and black in color. The resultant nickel particles were attracted to a permanent magnet as a powder as well as when dispersed in a solvent. This was a quick verification that zero valent nickel was generated.

Nano- and/or micro-scale zero valent metal particles were formed. Some of the particles prepared were large hollow spheres, while others were in aggregates of nano and micro particles. In one experiment, a total of about 415 particles were measured and their sizes ranged from about 0.4 µm to about 9.7 µm. The average particle size was about 1.9 µm with a standard deviation of 1.5 µm.

When solid powder of nickel produced from $Ni(OH)_2$ and NiO were dispersed in methanol under an ultrasonic treatment, TEM study showed a bimodal particle size distribution including micron sized primary particles (e.g., agglomerated particles) and nanoparticles. A particle size distribution of about 576 particles distributed log normal with an average maximum dimension of about 15.8 nm with a standard deviation of 12.1 nm. These results indicated the complexity of the particle formation process.

The A-RES Ni particles were created by "explosive" decomposition of urea. That is, 'trapped' urea explosively decomposed. The vast volume change upon decomposition (solid to gas) lead to significant volume expansion. In the case where the urea was "trapped", shattering of the encapsulating material to form nanoparticles occurred.

Control experiments were conducted by passing $Ni(OH)_2$ and NiO separately in the furnace at about 1000° C. without any urea. As a result, there was a slight change of color but neither powder was attracted by permanent magnet. That is, no zero valent metal was formed.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values, in this case, the example value of range stated as "less than 10" can assume values as defined earlier plus negative values, e.g. −1, −1.2, −1.89, −2, −2.5, −3, −10, −20, −30, etc.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method of forming metal particles comprising:
    forming an aerosol stream comprising an inert carrier gas, one or more precursor compounds and a chemical agent that produces reducing gases upon thermal decomposition, wherein each of the one or more precursor compounds comprises one or more metals, wherein the aerosol stream comprises a solid concentration ranging from about 0.01% to about 50% by volume; and
    flowing the aerosol stream through a heated inert atmosphere in a reduction expansion synthesis (RES) reactor to form a plurality of zero valent metal particles corresponding to the one or more metals of the one or more precursor compounds,
    wherein a temperature of the heated inert atmosphere in the RES reactor is sufficient to thermally decompose the chemical agent to produce the reducing gas, and
    wherein the plurality of zero valent metal particles include hollow sphere particles having a diameter ranging from about 10 nm to about 10,000 nm and pores in the order of about 1% to about 80% of the size of the hollow sphere particles.

2. The method of claim 1, wherein each particle of the plurality of zero valent metal particles is a metal alloy particle comprising two or more distinct metals.

3. The method of claim 2, further comprising controlling a metal ratio between the two or more distinct metals by controlling a metal ratio between the precursor compounds in the aerosol stream, wherein the precursor compounds each comprise different metal atoms.

4. The method of claim 1, wherein the temperature of the heated inert atmosphere in the RES reactor is between a decomposition temperature of the chemical agent and a melting temperature of each of the one or more metal particles.

5. The method of claim 1, wherein the one or more precursor compounds comprise oxides, hydroxides, nitrates, hydrated nitrates, nitrides, oxide-nitrides, or halogens of one or more metals, and wherein each of the one or more metals comprises a metal in one or more columns of IB, IIB, VB, VIB, VIIB, IA, IIA, IIIA, or IVA in the periodic table.

6. The method of claim 1, wherein the chemical agent that produces reducing gases upon thermal decomposition comprises one or more nitrogen-hydrogen-containing molecules comprising urea [$(NH_2)_2CO$] or a compound containing —NH or —$NH_2$.

7. The method of claim 1, wherein each of the plurality of zero valent metal particles comprises a porous nanoparticle having a pore size ranging from about 1 nm to about 100 nm.

8. A method of forming metal particles comprising:
    forming an aerosol stream comprising a metal precursor compound with a nitrogen-hydrogen (N—H) containing molecule in a carrier gas, wherein the metal precursor compound comprises a positive valent metal, wherein the aerosol stream comprises a solid concentration ranging from about 0.01% to about 50% by volume;
    flowing the aerosol stream through a heated inert atmosphere in a vertically oriented reduction expansion synthesis (RES) reactor to form a plurality of zero valent metal particles corresponding to the positive valence metal; and collecting the plurality of zero valent metal particles at a bottom end of the vertical RES reactor, wherein the plurality of zero valent metal particles include hollow sphere particles having a diameter ranging from about 10 nm to about 10,000 nm and pores in the order of about 1% to about 80% of the size of the hollow sphere particles.

9. The method of claim 8, wherein the heated inert atmosphere in the RES reactor has a temperature ranging from about 1000° C. to about 1500° C.

10. The method of claim 8, wherein the aerosol stream has a flow rate ranging from about 100 cc/min to about 1500 cc/min through the heated inert atmosphere.

11. The method of claim 8, wherein the aerosol stream flowing through the heated inert atmosphere for a residence time of less than 100 seconds.

12. The method of claim 8, wherein the plurality of zero valent metal particles are formed of at least one metal selected from the group consisting of Ni, Sb, Co, In, Fe, and Ga.

* * * * *